June 10, 1947.　　　L. S. HAMER　　　2,421,879
PLUG VALVE
Filed July 19, 1944　　　2 Sheets-Sheet 1

INVENTOR.
Leland S. Hamer
BY
Attorney

June 10, 1947.  L. S. HAMER  2,421,879
PLUG VALVE
Filed July 19, 1944  2 Sheets-Sheet 2

INVENTOR.
Leland S. Hamer
BY
Attorney

Patented June 10, 1947

2,421,879

UNITED STATES PATENT OFFICE 2,421,879

PLUG VALVE

Leland S. Hamer, Long Beach, Calif.

Application July 19, 1944, Serial No. 545,601

9 Claims. (Cl. 251—93)

This invention has to do with a plug valve and has particular reference to constructions for effecting seals in such devices, it being a general object of the invention to provide a plug valve wherein unique, effective and simple sealing means are provided for the plug of the valve.

A general object of my present invention is to provide a plug valve wherein the plug is rotatable and also shiftable lengthwise and wherein there is an effective sealing means for the plug when it is lifted to facilitate rotation. The plug in the preferred construction is tapered and is adapted to be moved lengthwise to seat tightly and is shiftable so that it is released from the seat when it is desired to rotate it. The present invention provides a simple, effective seal for the plug preventing leakage around the stem of the plug when the plug is lifted, allowing the usual packing gland around the stem to be repacked without leakage even though pressure is maintained on the valve.

Another object of my invention is to provide a unique and simplified arrangement for applying a sealing medium to a plug valve. In the ordinary plug valve channels or grooves are provided between the plug and its carrier or case, and sealing materials such as packings or grease are introduced into the channels from the exterior of the structure. By my present invention I introduce sealing material through a stud which also serves to retain the cap or bonnet in place and which holds the packing follower that normally retains packing around the stem of the valve. The construction of the present invention minimizes the number of parts involved in the construction and minimizes and simplifies manufacture.

Figure 1:
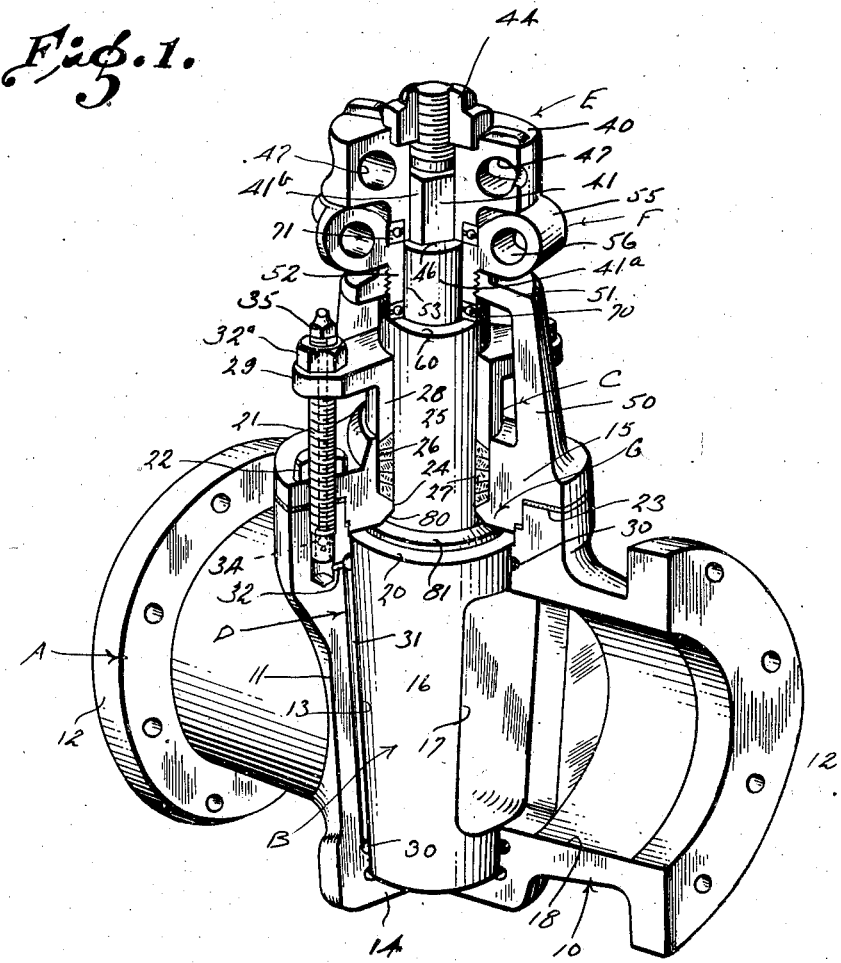
Figure 2:
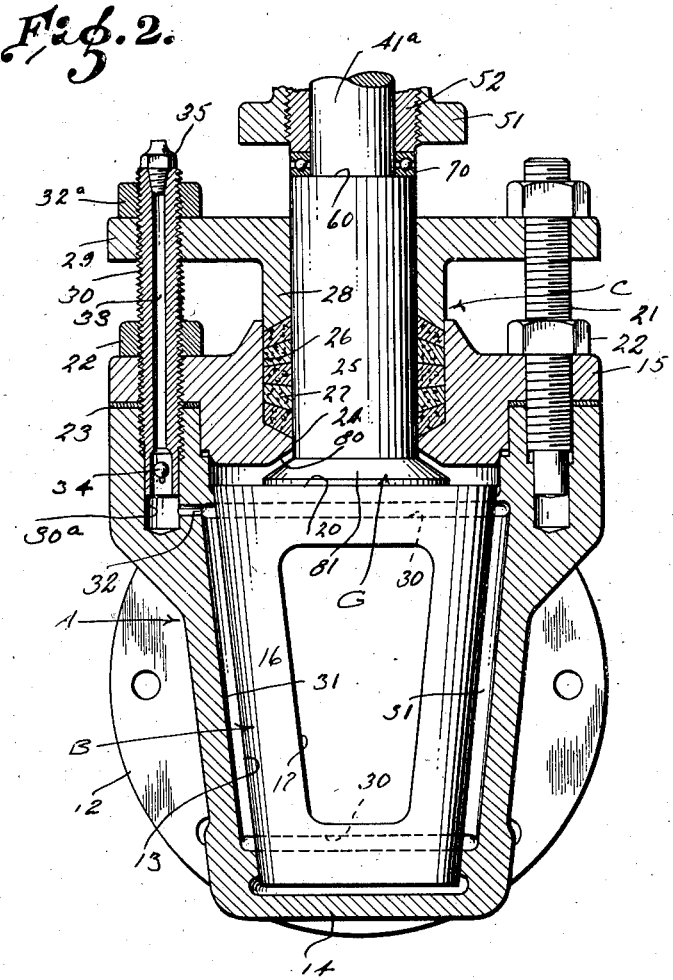

The various objects and features of my invention will be fully understood from the following detailed description of a typical preferred form and application of the invention, throughout which description reference is made to the accompanying drawings, in which:

Fig. 1 is a perspective view of a valve embodying the present invention showing parts broken away to illustrate the internal construction, and Fig. 2 is a vertical detailed sectional view of the construction provided by the invention.

The device of the present invention involves, generally, a body A, a plug B operable in the body, means C normally packing between the stem of the valve and the cap of the body, means D for packing between the plug and the body, means E for rotating the plug, means F for reciprocating the plug or shifting it axially in the body, and means G for sealing between the plug and bonnet of the body when the plug is lifted, thus allowing the means C to be repacked while the valve is under pressure.

The body A may be of the type commonly found in plug valves and in practice its particular form or design will depend somewhat upon the particular use to which it is to be put. In the drawings I have shown a typical body wherein there is a horizontally disposed conduit 10 and a transversely disposed plug case 11. The conduit 10 is divided by the case into two opposite aligned end sections. Suitable coupling means is provided at the outer end of each of such sections. In the case illustrated the coupling means is in the form of flanges 12 formed integrally on the ends of the conduit 10 so that the device can be coupled in a pipe line or with other apparatus through simple flange connections.

The case portion of the body A is arranged transversely of the conduit portion 10 and may be considered as being vertically disposed, as shown in the drawings. The case has a tapered opening 13 to rotatably carry the plug B. The lower or small end of the case is closed by an end wall 14 while the upper or large end is closed by a bonnet or cap 15. In the particular case illustrated the wall 14 is a solid, integral wall, whereas the cap 15 is detachable.

The plug B is of the general type common to plug valves and has a tapered exterior surface 16 which fits the tapered opening 13 of the case 11. An opening 17 is formed transversely through the plug to pass fluid, the plug being rotatable in the case so that the opening 17 can be moved into and out of register with the opening 18 of the conduit section 10 of body A. In the case illustrated I have shown an elongate opening 17 in the plug as such form of opening is advantageous in devices of this kind, particularly when they are of large size.

The plug B has its exterior 16 finished to slidably fit the tapered opening 13 in the case 11 and is proportioned as to length so that its lower end 19 is normally spaced slightly from the end wall 14 of the case while its upper end 20 is normally spaced from the cap 15 of the body. Through this construction the plug is somewhat shorter than the opening in the case which accommodates it, thus allowing for reciprocation or lengthwise movement of the plug in the case. If the plug is moved downwardly in the case or toward the small end of the tapered opening 13 it is brought into sealing engagement with the wall of the case, whereas if the plug is moved upwardly it is released from the case, freeing it for rotation.

The bonnet or cap 15, which closes the upper end of the plug case 11, is in the general form of a plate forming a closure for the case. The cap is retained in place by two or more studs 21 which project upwardly from the case 11 to extend through openings in the cap. Nuts 22 are threaded on the studs so that they can be tightened against the top of the cap in order to clamp the cap to the upper end of the case. In practice a suitable gasket 23 is interposed between the cap and the upper end of the case to establish a tight joint between these parts. The cap 15 is provided with a central bore or opening 24. The stem 25 of the valve C passes through opening 24.

The means C normally packing the stem of the valve with the cap 15 involves a gland opening 26 formed in the cap 15 from its upper end to carry packing 27. A follower 28 is slidably mounted on the stem 25 above the cap 15 to bear on the packing 27. Ears 29 of the follower are slidably engaged on extensions 30 of the studs 21 and nuts 32ª are threaded on the stud extensions 30 above the ears 29 so that they can be tightened against the ears to force the follower downward into pressure engagement with the packing 27. By thus employing parts or extensions of the studs 21 to handle the operation of the follower 28 I have provided a very simple, inexpensive, yet practical construction.

The means D for packing between the plug C and the case 11 involves, generally, channels or passages between the case and the plug, one or more parts for introducing packing material into the said channels, and means for introducing packing into the ports. My present invention is not particularly concerned with the formation, arrangement or construction of the channels provided between the plug and its case. For purpose of example I have shown an annular channel 30 in the tapered wall 13 of the case near each end of the case, to be beyond the ends of the opening 17 through the plug and I have shown longitudinal channels 31 connecting the annular channels 30. A supply port 32 is shown connecting the annular channel 30 in the upper end of the case with the opening 30ª provided in the upper end portion of the case to carry one of the studs 21. In accordance with my invention I provide a longitudinal port 33 through the stud 21 which is arranged in the opening 30ª. The port 33 extends completely through the stud from one end to the other and in the preferred construction a check valve 34 is provided in the lower end of the stud to allow packing material to be introduced into the part 32 but to prevent its escape therefrom through the stud. Further, a suitable fitting 35 is provided at the upper end of the stud to cooperate with suitable equipment or apparatus that may be employed in introducing packing material to the device. In many instances grease is employed as the packing material, and therefore, I have shown a grease connection or grease fitting at 35.

With the construction and arrangement above described, packing material such as grease can be introduced through the fitting 35 to pass downwardly through the port 33 in the stud so that it passes through the supply port 32 to the channels established between the plug and its case. Through this construction the packing material is introduced between the case and the plug without requiring special fittings or devices on the case or plug. The stud through which the packing material is introduced is an active element of the construction being employed to hold the cap and has a part of the means for actuating the follower of the packing means C. By my invention I have entirely eliminated the application of fittings or connections specially applied to the case or to the plug for the handling of the packing material.

The means E provided for rotating the plug in the case involves a head 40 fixed on an extension 41 of the stem 25. The extension of the valve stem is of reduced diameter and has a round lower end portion 41ª and a polygonal upper end portion 41ᵇ. The head 40 is in the form of an enlargement or plug carried on the polygonal upper end portion 41ᵇ. The head has an opening 42 corresponding in shape to the part 41ᵇ so that the head is held on the stem against rotation relative thereto. A nut 44 is threaded on the tip portion 45 of the stem extension so that the head 40 is clamped against the shoulder 46 of the stem which occurs between the portions 41ª and 41ᵇ. The head 40 is adapted to be engaged by a wrench or suitable operating tool. In the case illustrated the head has a plurality of bar openings 47 formed in it to receive operating rods or bars.

The means F provided for reciprocating the plug in the case includes legs 50 projecting upwardly from the cap 15 to carry a plate 51 opposite the round stem extension 41ª. An actuating member 52 is threaded in a central opening in the plate 51 and has an opening 53 through which the stem part 41ª passes. The actuating member 52 being threaded in the plate 51 can be moved up or down through rotation. To facilitate rotation of the member 52 I provide the member with projections or ears 55 which have bar openings 56.

The parts are arranged and related so that the operating member 52 can be moved downwardly to act on the shoulder 60 provided on the stem between the main part of the stem and the extension portion 41ª or can be operated to move upwardly to act on the lower end of the head 40. In the preferred construction I provide an antifriction bearing 70 between the lower end of the member 52 and the shoulder 60 and I provide an antifriction bearing 71 between the upper end of the member 52 and the lower end of the head 40.

The means G provided by my invention for sealing between the plug and the cap when the plug is lifted involves a seat 80 provided on the lower or inner end face of the cap 15 and a corresponding or complementary seat 81 provided on the upper end of the plug around the stem 25. In the preferred construction I bevel or pitch the seats 80 and 81 substantially as shown in the drawings so that there is a tapered or wedge fit between them and I finish, preferably grind, the seating or sealing parts 80 and 81 so that the seat between them is accurate and tight.

During normal operation of the plug, for instance when it is down and seated in its case, the seating surfaces 80 and 81 are separated, but when it is desired to operate the plug, that is, to turn it in its case, I may if necessary first operate the means F by rotating the member 52 so that the plug is lifted in its case. If it is desired to repack means C I may lift the plug, causing the seat or face 81 on the plug to move into pressure engagement with the face or seat 80 in the cap 15. Under this condition the plug is free of the tapered opening 13 in the case and there is a seal around the stem so the means C can be released allowing the packing 27 to be removed and replaced if necessary.

From the foregoing description it will be apparent that I have, by my present invention, provided a simple, practical and effective plug valve construction wherein there is a simple, effective means for supplying packing material between the plug and its case, and where under normal circumstances, or under normal operating conditions, the means G is operable to pack around the stem of the valve preventing leakage around the stem when that is desired.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A plug valve including a body, a plug rotatable in the body, the body including a cap arranged over the plug, a stud on the body retaining the cap on the body, and means establishing packing between the plug and body including packing channels between the plug and body, the stud having a port through which packing can be introduced from the exterior of the valve to the channels.

2. A plug valve including a body, a plug rotatable in the body, the body including a cap arranged over the plug, a stud on the body retaining the cap on the body, and means establishing packing between the plug and body including packing channels between the plug and body, the stud having a port through which packing can be introduced from the exterior of the valve to the channels, and a check valve controlling flow through the stud.

3. A plug valve including a body, a plug rotatable in the body, the body including a cap arranged over the plug, a stud on the body retaining the cap on the body, and means establishing packing between the plug and body including packing channels between the plug and body, the stud having a port through which packing can be introduced from the exterior of the valve to the channels, and a fitting on the outer end of the stud for introducing packing material into the stud.

4. A plug valve including a body, a plug rotatable in the body, the body including a cap arranged over the plug, a stud on the body retaining the cap on the body, and means establishing packing between the plug and body including packing channels between the plug and body, the stud having a port through which packing can be introduced from the exterior of the valve to the channels, a check valve controlling flow through the stud, and a fitting on the outer end of the stud for introducing packing material into the stud.

5. A plug valve including a plug case with a separable cap, a plug rotatably mounted in the case and having a stem projecting through the cap, a stud projecting from the case and connected with the cap to hold it in place, packing means between the plug and case, there being a port through the stud for passing packing to said means, and packing means between the stem and cap including a follower cooperatively connected with the stud.

6. A plug valve including a plug case with a separable cap, a plug rotatably mounted in the case and having a stem projecting through the cap, sealing faces on the plug and cap adapted to be moved into cooperative engagement, a stud projecting from the case and connected with the cap to hold it in place, packing means between the plug and case, there being a port through the stud for passing packing to said means, and packing means between the stem and cap including a follower cooperatively connected with the stud.

7. A plug valve including a plug case with a separable cap, a plug rotatably mounted in the case and having a stem projecting through the cap, a stud projecting from the case and connected with the cap to hold it in place, packing means between the plug and case, there being a port through the stud for passing packing to said means, a check valve controlling flow through the stud, and packing means between the stem and cap including a follower cooperatively connected with the stud.

8. A plug valve including a plug case with a separable cap, a plug rotatably mounted in the case and having a stem projecting through the cap, a stud projecting from the case, a nut on the stud engaging the cap to hold it in place, packing means between the plug and case, there being a port through the stud to pass packing to said means, and packing means between the stem and cap including packing in the cap, a follower on the stem engaging the packing, and a nut on the stud operating the follower.

9. A plug valve including a plug case with a separable cap, a plug rotatably mounted in the case and having a stem projecting through the cap, sealing faces on the plug and cap adapted to be moved into cooperative engagement, means for operating the plug to move said faces into cooperative engagement, a stud projecting from the case and connected with the cap to hold it in place, packing means between the plug and case, there being a port through the stud for passing packing to said means, and packing means between the stem and cap including a follower cooperatively connected with the stud.

LELAND S. HAMER.

REFERENCES CITED

The following references are of record in the file of this patent:

UNITED STATES PATENTS

| Number | Name | Date |
|---|---|---|
| 2,047,752 | Specht | July 14, 1936 |
| 2,066,250 | Clark | Dec. 29, 1936 |
| 2,119,766 | Aderhold | June 7, 1938 |
| 1,905,684 | Coffman | Apr. 25, 1933 |
| 2,142,795 | McFarlane | Jan. 3, 1939 |
| 1,707,145 | Simons | Mar. 26, 1929 |

FOREIGN PATENTS

| Number | Country | Date |
|---|---|---|
| 184,241 | Great Britain | July 31, 1922 |